W. A. HARRIS.
LOW PRESSURE ALARM FOR PNEUMATIC TUBES.
APPLICATION FILED MAR. 6, 1919.
1,313,533.
Patented Aug. 19, 1919.
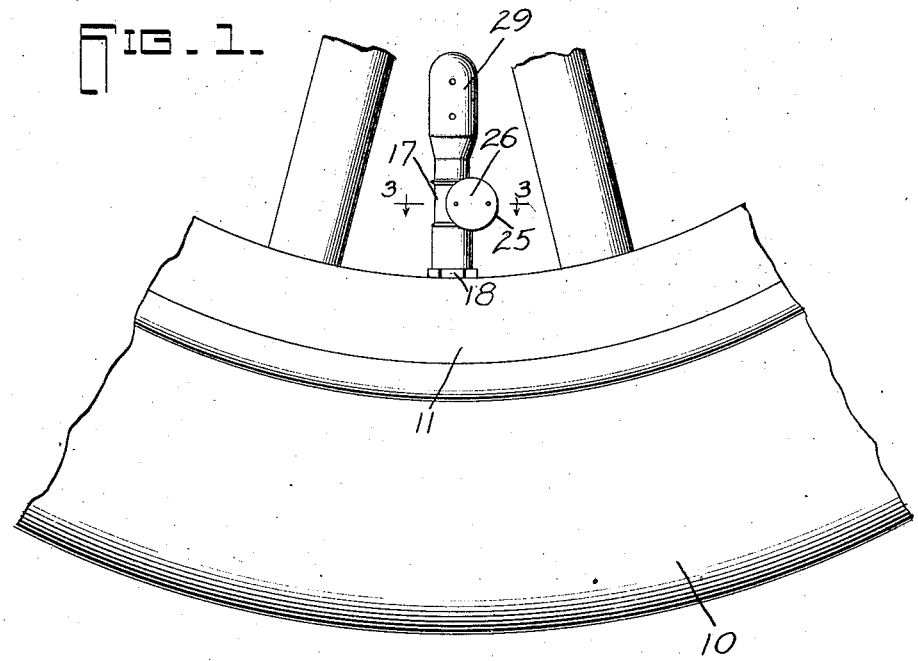
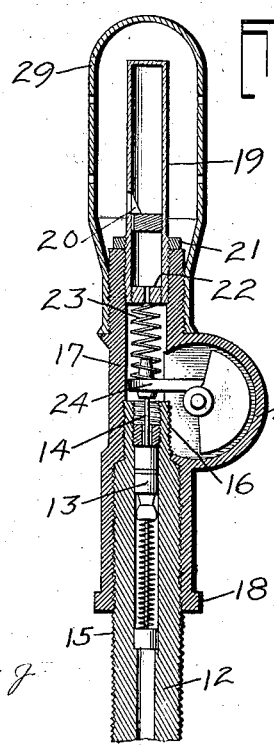
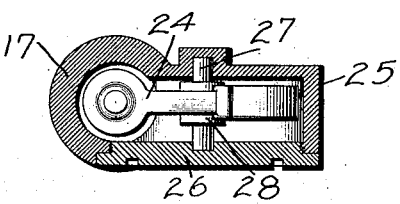
WITNESSES
INVENTOR
W. A. HARRIS
BY
ATTORNEYS

UNITED STATES PATENT OFFICE.

WILLIAM ANDREW HARRIS, OF GREENVILLE, SOUTH CAROLINA.

LOW-PRESSURE ALARM FOR PNEUMATIC TUBES.

1,313,533. Specification of Letters Patent. Patented Aug. 19, 1919.

Application filed March 6, 1919. Serial No. 280,889.

*To all whom it may concern:*

Be it known that I, WILLIAM A. HARRIS, a citizen of the United States, and a resident of Greenville, in the county of Greenville and State of South Carolina, have made certain new and useful Improvements in Low-Pressure Alarms for Pneumatic Tubes, of which the following is a specification.

My present invention relates generally to signals, and more particularly to a low pressure signal for pneumatic tires or tubes, my object being the provision of a simple inexpensive device which may be applied directly to the usual valve tube of a pneumatic tire, without necessitating any change in the structure either of the tube or tire valve, and which will operate to effectively sound a signal upon the fall of pressure within the tire below a predetermined point.

A further object of my invention is the provision of a simple, inexpensive and durable arrangement of this character, and a still further object is the provision of a low pressure signal for tires having means whereby to counteract the effect of centrifugal force in movement in use so as to insure operation of the signal at the predetermined point, irrespective of whether the tire or tube is stationary or in motion.

Generally speaking, my invention proposes an attachment including an audible mechanical signal operated by air pressure from the tube brought about by the opening of the air valve by means capable of operation only, when the pressure within the tire or tube falls below a predetermined point, and my invention proposes a construction including certain means to prevent the released air pressure from overloading the signal as hereinafter described.

In the accompanying drawing illustrating my present invention and forming a part of this specification:—

Figure 1 is a side view of a portion of a wheel and its tire equipped with my improvements;

Fig. 2 is a vertical longitudinal section through a valve stem and valve, and through my improvements in operative relation thereto, and, Fig. 3 is a cross section through my improvements taken substantially on line 3—3 of Fig. 1.

Referring now to these figures, I have shown in Fig. 1 a tire 10, on a rim 11 inwardly beyond the latter of which the valve stem of the tire tube projects. This valve stem is seen at 12 in Fig. 2, and is of a type almost universally used at the present time with what is commonly known as a "Schrader" inside valve, generally indicated at 13 and having a pin 14, the extremity of which projects adjacent to the extremity of the valve tube or stem 12. The valve stem or tube 12 as well known, is externally threaded at 15, and has its free end reduced and threaded as at 16 for the reception of the usual valve cap, the latter of which is removed in utilizing my invention.

My invention proposes a signal which includes an elongated tubular casing generally indicated at 17, and internally threaded adjacent one end to screw downwardly upon the external threads 15 of the valve stem or tube, the respective end of the tubular body 17 having an external polygonal portion 18 by virtue of which the signal tube or body may be screwed tightly against the inner surface of the rim 11, as desired.

The opposite end of the tubular body 17 is internally threaded to receive one externally threaded end of a signal tube 19, wherein a whistle is formed at 20, and this tube 19 may be effectively held in place by a lock nut 21 which threads upon the lower end of the same and engages the upper end of the body 17.

It is of course to be understood that in connection with the tube 19, the whistle 20 may be formed in any suitable manner and in fact the tube 19 itself may be dispensed with in favor of another form of signal device. The inner end of this tube, as shown, provides for certain structural advantages which I will now mention, including a plug 22 threaded therein, and provided with a minute air opening, as shown located centrally of the plug, so that the rush of air from the tire when valve 13 is open will be prevented from clogging the whistle. This plug 22 also forms a supporting abutment for one end of a coil spring 23, the tension of which is set at a desired point, dependent upon the pressure at which it is desired that the signal be actuated, the opposite end of the spring engaging an arm 24, which in turn bears at one end against the exposed outer end of the valve pin 14.

It is obvious, however, that if only those means so far described were provided to take care of the operation of the device, there would be a great variance between its action when stationary and when in motion with the rotation of the wheel on which the particular tire is employed, inasmuch as the centrifugal force in motion would greatly assist the spring 23 in forcing the air valve open, and would thus bring about an actuation of the signal at a much higher pressure than the same parts would bring about when the wheel is stationary.

To counteract this disadvantage and compensate for the centrifugal action in use, I provide the tubular body 17 of the signal with a lateral enlargement 25 at a point intermediate its ends, this enlargement having one removable side plate 26 as seen in Fig. 3, and having bearings in its opposite side walls for the ends of a stub shaft 27, on which a weighted counter balance 28 is secured. From this counter balance and rigid therewith the arm 24 previously mentioned extends, and thus the tendency of a centrifugal force to assist the tension of spring 23 is counteracted by the weighted balance 28 which is of course subject to the centrifugal force the same as the spring.

Thus I am enabled to set the spring 23 at a predetermined tension to open the tire valve 13 against the internal pressure when said internal pressure falls below a predetermined amount and insure that the parts will accurately operate to sound the signal upon fall of pressure below the predetermined point irrespective of whether the wheel is in motion or at rest.

The upper end of the tubular body 17 of the signal is preferably externally threaded for the reception of an apertured cap 29 which extends over and around and protects the whistle tube 19 against injury and from contact with heavy flying particles.

My invention thus proposes a device of this nature which may be applied to and removed from the usual tire valve tube or stem with ease and facility, as well as a device for the purpose which is both simple and inexpensive and one which will be durable and uniformly effective in use.

I claim:—

1. The combination with a tire valve and its tube, of a signal device including a tubular body, one end being internally threaded to screw on to the valve tube, said tubular body having a lateral enlargement intermediate its ends, a tubular whistle fixed in the opposite end of the tubular body having an apertured plug at its inner end, a weighted counter-balance journaled in the enlarged portion of the said tubular body and having an arm projecting therefrom for engagement with the valve pin in the said valve tube, and a spring within the tubular body engaging the said counterbalance arm at one end and bearing at its opposite end against the plug of the whistle tube, as described.

2. The combination with a tire valve and its tube, of a signal device including a tubular body internally threaded at one end to screw upon the valve tube, a signal at the opposite end of the tubular body, a spring within the said tubular body having a set tension, and bearing against the pin of the pneumatic valve, said tubular body having a lateral enlargement at one side at a point intermediate its ends and a weighted counter-balance journaled in the said enlargement of the body and having a portion extending between the said spring and the valve pin.

3. The combination with a pneumatic tire valve, of a low pressure signal comprising a tubular body portion internally and externally threaded at its opposite ends, a tube threaded within the last mentioned end of the body having a whistle, a protecting cap extending around the whistle tube and engaging the external threads of the body, a plug within the inner end of the whistle tube having an aperture therethrough, a spring, one end of which bears against the said plug, and a weighted counterbalance journaled in a portion of the said tubular body and having a part thereof projecting into the bore of the body and engaged by the opposite free end of the spring, as described.

4. The combination with a pneumatic tire valve, of a low pressure signal comprising a tubular body portion internally and externally threaded at its opposite ends, a tube threaded within the last mentioned end of the body, having a whistle, a protecting cap extending around the whistle tube and engaging the external threads of the body, a plug within the inner end of the whistle tube having an aperture therethrough, a spring, one end of which bears against the said plug, a weighted counter-balance journaled in a portion of the said tubular body and having a part thereof projecting into the bore of the body and engaged by the opposite free end of the spring, said tubular body having a lateral enlargement at a point intermediate its ends in which the weighted counter balance is disposed provided with one side wall in the form of a screw closing clap, for the purpose described.

5. The combination with a pneumatic tire valve, of a low pressure signal comprising a body portion having an air actuated signal at one end, and internally threaded at its opposite end to engage the external threads of a valve tube, a spring within the body having a rigid bearing at one end therewith, and means carried by the body and engaging the said spring to counteract the effect of centrifugal motion on the spring in use.

6. The combination with a pneumatic tire valve, of a low pressure alarm for pneumatic valves consisting of a tubular body internally threaded at one end, an air operated signal carried by the said tube, a valve opening spring having bearing within a tube, and means in connection with said spring for counteracting the effect of centrifugal motion upon the spring in use.

7. The combination with a pneumatic tire valve, of a low pressure alarm for pneumatic valves consisting of a tubular body internally threaded at one end, an air operated signal carried by the said tube, a valve opening spring having bearing within a tube, and means in connection with said spring for counteracting the effect of centrifugal motion upon the spring in use, said last named means being in the form of a weighted counter-balance having a portion thereof engaged by the free end of the spring, as described.

WILLIAM ANDREW HARRIS. [L. S.]

Witnesses:
 JAMES R. BATES,
 DIXIE H. RECTOR.